United States Patent
Kraska

[19]

[11] Patent Number: 6,110,068
[45] Date of Patent: Aug. 29, 2000

[54] METHOD FOR CONTROLLING AN AUTOMATIC TRANSMISSION BY SENSING FRICTION ELEMENT TORQUE CAPACITY

[75] Inventor: Marvin Paul Kraska, Dearborn, Mich.

[73] Assignee: Ford Global Technologies, Inc., Dearborn, Mich.

[21] Appl. No.: 09/368,219

[22] Filed: Aug. 4, 1999

[51] Int. Cl.[7] .............................. F16D 66/00; F16D 66/02
[52] U.S. Cl. .................................. 475/146; 188/1.11 W; 188/1.11 L
[58] Field of Search ....................................... 475/116, 146; 188/77 R, 1.11 W, 1.11 L

[56] References Cited

U.S. PATENT DOCUMENTS

| | | |
|---|---|---|
| 4,617,968 | 10/1986 | Hendrixon . |
| 4,962,831 | 10/1990 | Dundas . |
| 5,002,909 | 3/1991 | Ichikawa et al. . |
| 5,240,041 | 8/1993 | Garnjost . |
| 5,244,002 | 9/1993 | Frederick . |
| 5,253,735 | 10/1993 | Larson et al. ........................... 188/1.11 |
| 5,450,930 | 9/1995 | Martens et al. ......................... 188/1.11 |
| 5,722,459 | 3/1998 | Kim et al. . |
| 5,787,915 | 8/1998 | Byers et al. . |
| 5,826,616 | 10/1998 | Golden . |

*Primary Examiner*—Dirk Wright
*Attorney, Agent, or Firm*—Frank G. McKenzie

[57] ABSTRACT

A method for controlling torque transfer between first and second friction elements in an automatic transmission having a hydraulic band brake servo in which a magnet is fixed to a displaceable piston, and a sensor producing a signal responsive to the sensed intensity of a field produced by the magnet representing the position of the servo piston, producing from the signal an indication of the position of the servo piston, determining a reference threshold servo position corresponding to incipient band brake torque capacity, and reducing pressure in the second friction element when the current servo displacement equals the threshold displacement.

6 Claims, 2 Drawing Sheets

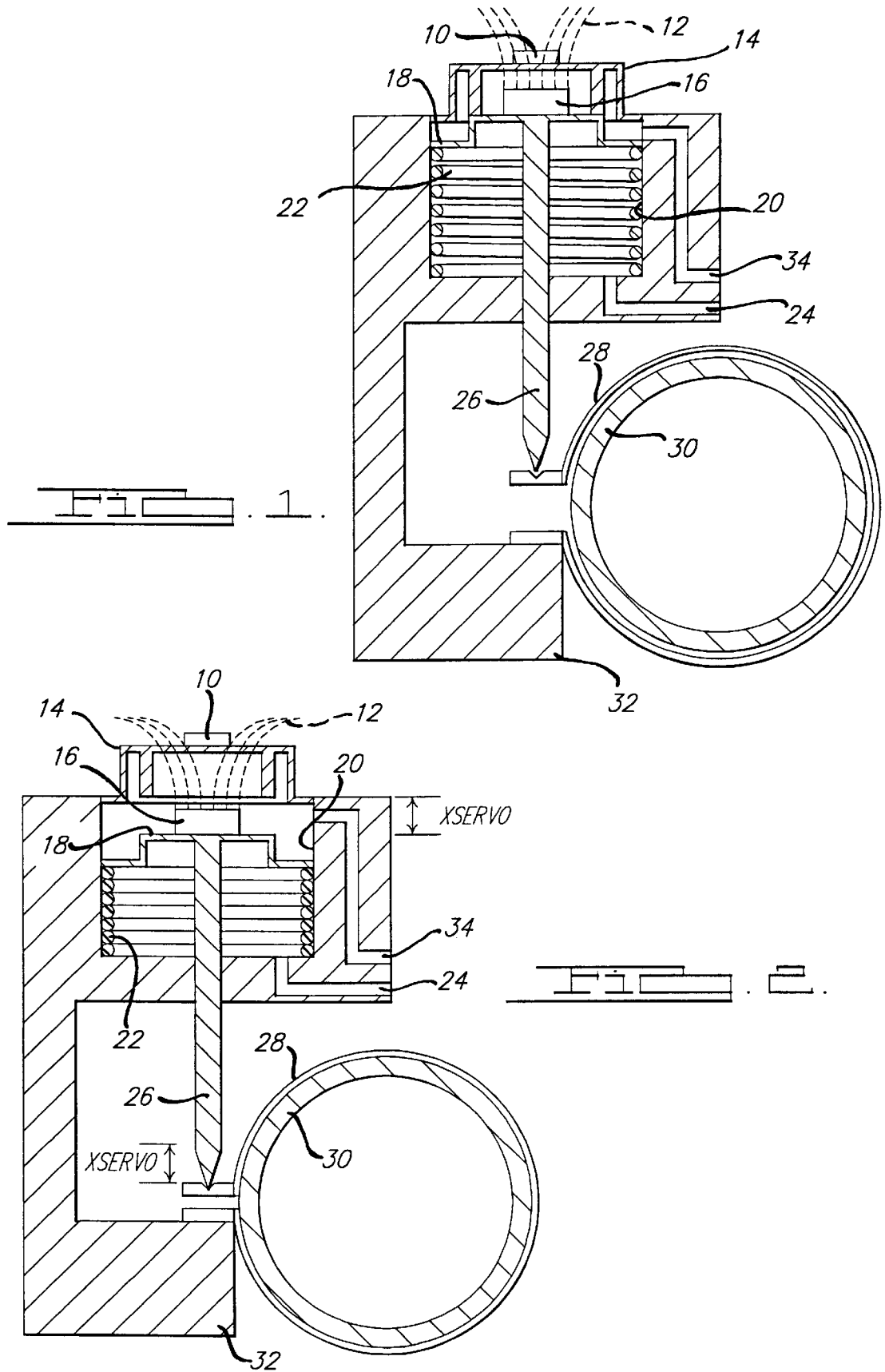

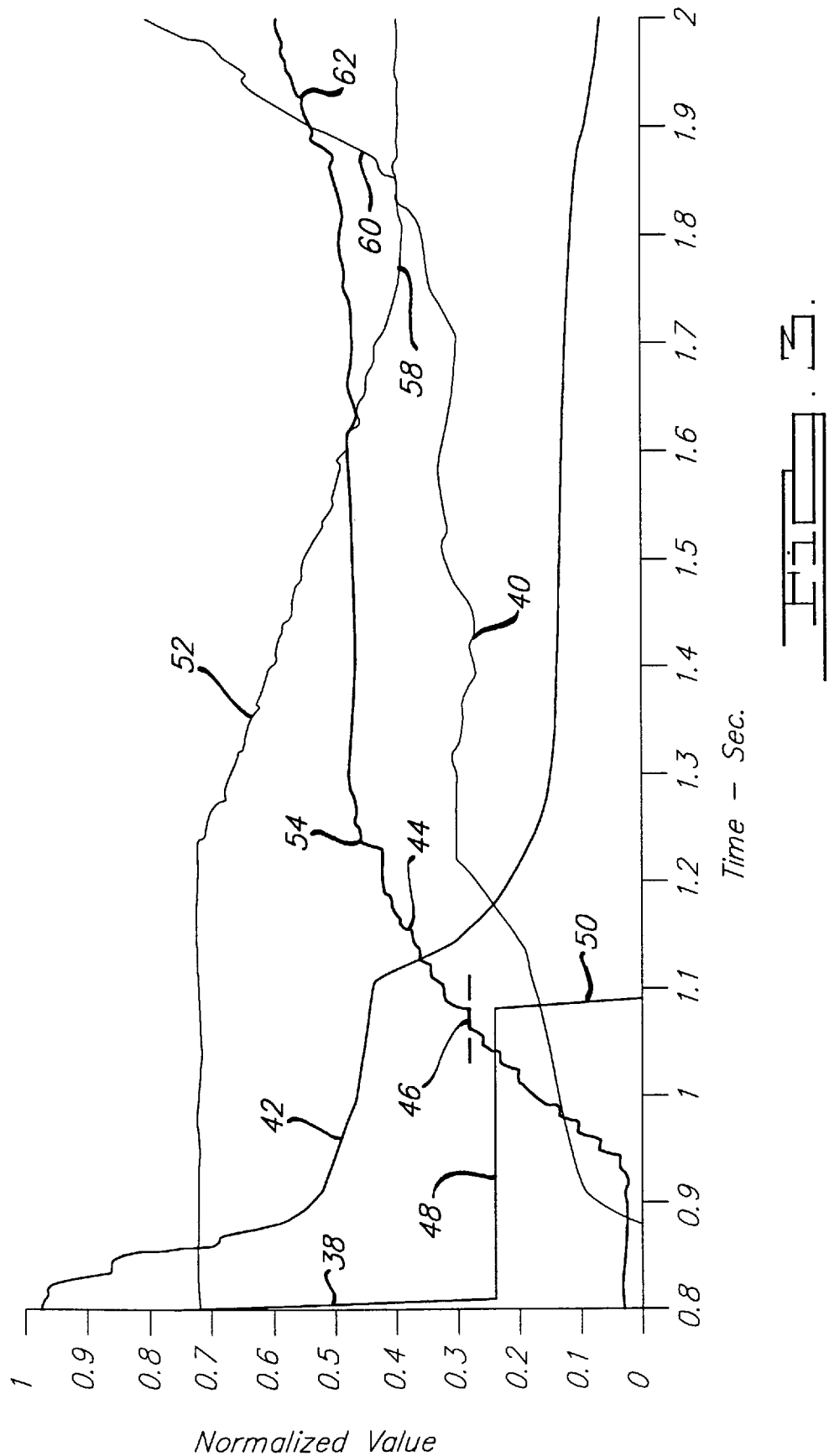

METHOD FOR CONTROLLING AN AUTOMATIC TRANSMISSION BY SENSING FRICTION ELEMENT TORQUE CAPACITY

BACKGROUND OF THE INVENTION

1. Field of the Invention

This invention relates to the field of hydraulic systems, more particularly it pertains to control of speed ratio changes produced by such systems in an automatic transmission for a motor vehicle.

2. Description of the Prior Art

Shifting a synchronous automatic transmission is accomplished by applying or releasing a friction element (band brake or clutch) that changes the speed and torque relationship by means of a planetary gearset. Precise control of friction element torque capacity is vital to providing and maintaining good shift quality and durability. Because attaching a sensor directly to the friction element actuator can be difficult or impossible, conventional synchronous shift control strategies depend on estimating actuator pressure to infer actuator position and friction element torque capacity. Unit-to-unit variations and component variations over the life of the transmission may cause shift quality degradation with the conventional approach. In addition, response of software control to driver change-of-mind gearshifts relies on estimated clutch capacity with the conventional approach, which may not be optimum in all situations because of uncertainty in the estimate.

SUMMARY OF THE INVENTION

The method of this invention overcomes the uncertainty of estimating friction element capacity by directly measuring the position of a servo that actuates the friction element. By this method, a signal is available representing the full range of servo travel, so that precise thresholds may be established for control software to manage the torque transfer or inertia phase of the transfer of torque from the offgoing to the oncoming friction element, wherever the friction element is actively used. The thresholds may be adaptively modified to compensate for variations in operating conditions, and out-of-range values of this signal may be used to indicate and manage a hardware failure.

In realizing these objects and advantages in an automatic transmission having hydraulically-actuated first and second friction elements, a magnet fixed to a displaceable member of a second friction element, a sensor producing a signal responsive to the intensity of a field produced by the magnet representing displacement of the second friction element relative to a reference position, the method of this invention includes the steps of reducing excess torque capacity of the first friction element by decreasing pressure in the first friction element; displacing the second friction element by increasing pressure in the second friction element; determining from the signal the current displacement of the second friction element; determining a reference displacement of the second friction element that corresponds to incipient torque capacity of the second friction element; increasing the time rate of decreasing pressure in the first friction element after said current displacement becomes substantially equal to said reference displacement; completing a transfer of torque from the first friction element to the second friction element by increasing pressure in the second friction until said current servo displacement stops increasing.

BRIEF DESCRIPTION OF THE DRAWINGS

FIG. 1 is a cross section through a brake servo in the released position, the servo for operating a band to brake of an automatic transmission.

FIG. 2 is a cross section through the brake servo of FIG. 1 showing the servo in the applied position.

FIG. 3 is a graph showing the time rate of change of several variables during a synchronous upshift of an automatic transmission by the method of this invention.

DESCRIPTION OF THE PREFERRED EMBODIMENT

In FIG. 1, a sensor 10, an inexpensive, linear, magnetic field strength, semiconductor sensor of either the Hall-effect or GMR type, senses the strength of a magnetic field 12 through a magnetically permeable cover 14, the magnetic field being generated by a permanent magnet 16 located on a ferrous servo piston 18. The servo defines a cylinder 20, which contains a return spring 22 and the piston, and communicates with hydraulic fluid pressure sources of servo apply pressure and servo release pressure. The return spring 22 and a force resulting from servo release pressure, communicated to cylinder 20 through port 24, hold piston 18 and rod 26 at the upper end of the cylinder in the release position, the position of FIG. 1.

Preferably the servo body is of aluminum alloy, the sensor is a linear Hall-effect sensor available commercially as Part Number A3515/6 from Allegro MicroSystems, Inc. of Worcester, Mass. The magnet preferably is a Neodymium Iron Boron (NdFeB) and Samarium (SmCo) magnet available commercially from Magnet Sales & Manufacturing Inc. of Culver City, Calif.

FIG. 2 shows the servo fully applied due to the effect of servo apply pressure communicated to cylinder 20 through port 34. When the servo is applied, downward movement of piston 18 is transmitted directly to rod 26, thereby forcing the band 28 to engage the outer surface of the drum 30 and to hold a component of a planetary gearset fixed against rotation on the transmission case 32. Servo apply pressure overcomes the spring force, and servo release pressure is usually entirely absent while the servo is being applied. Since the piston 18 and magnet 16 are directly coupled to rod 26, the signal XSERVO, representing displacement of the servo piston, also represents the extent to which the band brake is applied.

The voltage signal produced by sensor 10 varies according to the intensity of the magnetic field at the sensor and approximately in proportion to the square of the distance of the magnet from the sensor. The signal produced by the sensor 10 is compatible with analog input circuits in controllers and can be digitized to produce a digital signal indicative of band brake servo position. By proper interpretation of this signal, a control program can determine the degree of band brake engagement and the current torque capacity of the brake.

When the voltage signal of sensor 10 is sampled and digitized by a powertrain control module, the resulting signal, after being transformed by a table lookup, comprises a time series history of band brake servo position.

$$\text{servo position } X(k) = F(\text{analog-to-digital } V(t)), \tag{1}$$

wherein F( ) is implemented as a table lookup, and V_HXSERVO is expressed in volts.

Given the signal described in equation (1) above, the powertrain control system approximates the velocity and acceleration of the band brake servo piston by numeric differentiation of the time series:

$$\text{servo velocity } X\text{dot}(k) = (X(k) - X(k1))/T \tag{2}$$

$$\text{servo acceleration } X\text{ddot}(k) = (X\text{dot}(k) - X\text{dot}(k-1))/T, \tag{3}$$

wherein T is the controller sampling time.

Preferably the offgoing friction element is a hydraulically operated friction brake. The oncoming friction element preferably is a band brake, such as that actuated by the servo of FIG. 1, controlled by the method of this invention. Using the signals described in equation (1), incipient torque capacity of the brake band is determined by the powertrain control system by comparing the servo position X(k) to a predetermined and stored threshold servo position. This information is used to produce a reduction in torque capacity of an offgoing friction element, i.e., a friction element whose torque capacity is reduced to zero during the period of a current transmission speed ratio change.

The hydraulic fluid pressure sources of servo apply pressure, servo release pressure, and brake pressure are emitted from pressure sources controlled by variable force solenoids (VFS) that produce these pressures in response to commands from an electronic control system that continually executes algorithms that control transmission speed ratio changes.

FIG. 3 is a graph showing the change of several variables over time for a 1–2 upshift, a speed ratio change from first gear to second gear, performed in a transmission at 10 percent engine throttle opening. During the upshift, torque carried by the offgoing friction element during the prior speed ratio is transferred to the oncoming friction element.

When the 1–2 upshift begins, pressure in the offgoing brake is commanded to decrease sharply at 38, and the offgoing brake pressure 42, PRS_OFG_RAW, decreases in response to this commanded reduction, thereby reducing the excess torque capacity of the offgoing brake. Then the servo cylinder 20 of the oncoming band-brake is filled with hydraulic fluid through port 34, and the servo piston 18 is stroked by the servo apply pressure 40, PRS_ONC_RAW.

The servo displacement signal 44, V_HXSERVO, is the direct voltage output of the sensor 10 (F( )=1). As the band brake servo starts to move downward and to compress return spring 22, the corresponding V_HXSERVO signal indicates this servo displacement change. When servo displacement signal 44 increases to substantial equality with a predetermined reference servo displacement 46, the oncoming band brake 28 will have attained incipient torque capacity. Then the offgoing element pressure command 48, PRS-OFG, is reduced sharply to zero at 50. Thereafter, as pressure in the off-going brake PRS-OFG-RAW declines in response to the step reduction to zero of the corresponding pressure command 50, the band brake servo continues to stroke and increase its torque capacity until servo displacement stops increasing at 54. Once the torque transfer from the offgoing friction element to the oncoming friction element is completed, the servo apply pressure 40 is modulated to complete the inertia phase of the upshift.

A graph of the variation of the transmission speed ratio during the upshift is shown at 52. After the speed ratio decreases from the ratio corresponding to the first gear to the speed ratio corresponding to the second gear at 58, thereby indicating completion on the upshift, servo apply pressure increases rapidly 60 to increase its torque capacity, and the servo displacement responds accordingly with a slight increase 62.

If the servo displacement threshold 46 is a function of engine torque or transmission input torque, the torque exchange may be calibrated for minimum disturbance throughout the full range of engine throttle positions.

The sensing method of this invention is noninvasive, easily packaged, and takes advantage of magnetic permeability of a band brake servo body to sense internal servo piston movement from outside the servo. The signal produced by the sensor in response to the magnitude of magnetic field intensity is used to provide a reliable indication of incipient band brake torque capacity that is used to improve transmission shift quality.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

I claim:

1. A method for controlling a speed ratio change produced by an automatic transmission having hydraulically actuated first and second friction elements, a magnet fixed to a displaceable member of the second friction element, a sensor producing a signal responsive to the intensity of a field produced by the magnet representing displacement of the second friction element relative to a reference position, the method comprising the steps of:

reducing excess torque capacity of the first friction element by decreasing pressure in the first friction element;

displacing the second friction element by increasing pressure in the second friction element;

determining from the signal the current displacement of the second friction element;

determining a reference displacement of the second friction element that corresponds to incipient torque capacity of the second friction element;

increasing the time rate of decreasing pressure in the first friction element after said current displacement becomes substantially equal to said reference displacement; and completing a transfer of torque from the first friction element to the second friction element by increasing pressure in the second friction until said current displacement stops increasing.

2. The method of claim 1, further comprising:

maintaining pressure in the second friction element substantially at a magnitude corresponding to said pressure in the second friction element when said current displacement stops increasing; and changing the current speed ratio produced by the transmission to a desired speed ratio from a speed ratio produced immediately before the speed ratio change begins.

3. The method of claim 2, further comprising:

determining when the speed ratio produced by the transmission reaches the desired speed ratio; and increasing a torque capacity of the second friction element by rapidly increasing pressure in the second friction element after the current speed ratio reaches the desired speed ratio.

4. A method for controlling a speed ratio change in an automatic transmission having a hydraulically actuated band brake and friction element, a servo for actuating a band brake having a magnet fixed to a displaceable piston, a sensor producing a signal responsive to the intensity of a field produced by the magnet representing the position of the piston in the servo, the method comprising the steps of:

reducing the excess torque capacity of the friction element by decreasing pressure in the friction element;

displacing the servo by increasing pressure in the servo;

determining from the signal the current displacement of the servo piston;

determining a reference displacement of the servo piston that corresponds to incipient torque capacity of the band brake;

increasing the time rate of decreasing pressure in the friction element after said current servo piston displacement becomes substantially equal to said reference servo displacement; and completing a transfer of torque from the first element to the band brake by increasing pressure in the servo until said current servo piston displacement stops increasing.

5. The method of claim 4, further comprising:

maintaining pressure substantially at a magnitude corresponding said pressure in the servo when said current servo piston displacement stops increasing; and changing the current speed ratio produced by the transmission to a desired speed ratio from a speed ratio produced immediately before the speed ratio change begins.

6. The method of claim 4, further comprising:

determining when the speed ratio produced by the transmission reaches the desired speed ratio; and increasing a torque capacity of the band brake by rapidly increasing pressure in the servo after the current speed ratio reaches the desired speed ratio.

* * * * *